[19] United States Patent
Henderson

[11] 3,928,301
[45] Dec. 23, 1975

[54] POLYMERS OF 2-ETHYL-1,3-BUTADIENE AND METHOD OF THEIR PREPARATION

[75] Inventor: James Neil Henderson, Hudson, Ohio

[73] Assignee: The Goodyear Tire & Rubber Company, Akron, Ohio

[22] Filed: Jan. 12, 1972

[21] Appl. No.: 217,121

Related U.S. Application Data

[63] Continuation of Ser. No. 100,545, Dec. 21, 1970, abandoned, which is a continuation of Ser. No. 741,342, July 1, 1968, abandoned.

[52] U.S. Cl. .......................... 260/94.2 R; 260/94.3
[51] Int. Cl. .......................... C08d 3/04; C08d 1/14
[58] Field of Search ......... 260/94.3, 94.2 M, 94.2 R

[56] References Cited
UNITED STATES PATENTS

| | | | |
|---|---|---|---|
| 2,928,815 | 3/1960 | Hammer et al. | 260/93.7 |
| 2,977,349 | 3/1961 | Brockway et al. | 260/94.3 |
| 3,114,744 | 12/1963 | Lasky | 260/94.3 |

FOREIGN PATENTS OR APPLICATIONS

| | | | |
|---|---|---|---|
| 710,906 | 6/1965 | Canada | 260/94.3 |
| 716,173 | 8/1965 | Canada | 260/94.3 |

Primary Examiner—William F. Hamrock
Attorney, Agent, or Firm—F. W. Brunner; H. C. Young, Jr.

[57] ABSTRACT

Polymers of 2-ethyl-1,3-butadiene having substantially a trans-1,4 addition structure, having high green strength and rubberlike properties at room temperature and a method for their preparation.

1 Claim, No Drawings

POLYMERS OF 2-ETHYL-1,3-BUTADIENE AND METHOD OF THEIR PREPARATION

This is a Continuation of application Ser. No. 100,545 filed Dec. 21, 1970, which is a streamline continuation of application Ser. No. 741,342 filed July 1, 1968 now abandoned.

This invention relates to improved polymers of 2-ethyl-1,3-butadiene and to a method of preparing such polymers.

Trans-1,4 addition polymers of 1,3-conjugated dienes having from about 4 to about 6 carbon atoms have a highly desirable commercial utility because they are typically rubber-like above their melting point and because their green strength in their uncured state is very much greater than cis-1,4 addition polymers of comparable 1,3-conjugated dienes. Green strength of an uncured rubbery polymer is very important since it enables the polymer to be more easily fabricated into shaped and manufactured articles. However, the commercial utility of the trans-1,4-polymers is substantially reduced because they are typically crystalline at room temperature because of their relatively high melting points and therefore workable only with difficulty in their uncured state where the comparable cis-1,4 polymers are rubberlike at about room temperature and therefore considerably more easily workable. Thus the cis-1,4 polymers have achieved superior commercial importance even though their green strength is substantially less.

Therefore, it is an object of this invention to provide new and useful trans-1,4 addition polymers of a 1,3-conjugated diene having high green strength and rubber-like properties and a method of preparing such polymers.

In accordance with this invention, it was found unexpectedly that a polymer having high green strength and rubberlike properties at room temperature comprises a polymer of 2-ethyl-1,3-butadiene having substantially a trans-1,4-addition structure.

The polymers of this invention are preferably characterized by having a structure comprising at least about 85 percent of a trans-1,4 structure and more preferably at least about 95 percent of a trans-1,4 structure. The polymers of this invention are rubberlike above their melting point of preferably from about 18°C. to about 25°C. The polymers crystallize below their melting point to form crystalline polymers. The high green strength of the rubberlike polymers in their uncured state above their melting point is exemplified by high ultimate tensile strengths of from about 500 to about 2000 and preferably from about 1000 to about 2000 pounds per square inch at about 25°C. The uncured rubbery polymers of this invention preferably have an ultimate elongation of from about 400 to about 800 percent at about 25°C. Their inherent viscosity is generally from about 1 to about 15 dl/g (deciliters per gram) and usually from about 6 to about 10 dl/g as determined in benzene at 30° C. and their specific gravity is from about 0.90 to about 0.95.

Thus, the uncured polymers of this invention unexpectedly have crystalline melting points of about room temperature, are rubbery above their melting point, and yet have high green strengths in their rubbery state. The polymers may exist in a substantially amorphous state at room temperature. They can be cured according to methods used for natural rubber to form vulcanizates which are useful in various applications where natural or synthetic rubber are used or they can be blended with such rubbers in various applications, particularly in various industrial products and in tires.

The polymers of this invention are prepared by polymerizing 2-ethyl-1,3-butadiene in the presence of a catalyst system prepared from the components comprising (a) vanadium trichloride, (b) a trialkyl aluminum and (c) a tetrahydrocarbyl titanate. The catalyst system, its preparation, and mol ratios of the catalyst components are more fully disclosed in U.S. Pat. No. 3,114,744.

In further accordance with this invention, it has been found unexpectedly that titanium triacetylacetonate, the titanium therein having a valence state of three, can be substituted for the tetrahydrocarbyl titanate, the titanium therein having a valence of four, of the catalyst system to prepare the trans-1,4 polymers of this invention.

In the practice of this invention, the trialkyl aluminum is represented by the formula $AlR_3$ where it is preferred that R is a saturated aliphatic hydrocarbon radical having from 1 to 12 carbon atoms such as methyl, ethyl, n-propyl, isopropyl, N-butyl, isobutyl, hexyl and dodecyl radicals. The preferred trialkyl aluminums are triisopropyl aluminum and triisobutyl aluminum.

The preferred tetrahydrocarbyl titanates, $Ti(OR'_4)$, are those where $R'$ is a saturated alkyl radical having from 1 to 18 carbon atoms such as methyl, ethyl, propyl, isopropyl, butyl, isobutyl, 2-ethylbutyl, 2-ethylhexyl, dodecyl, and octadecyl radicals. A preferred tetrahydrocarbyl titanate is titanium tetraisopropoxide.

The catalyst used in this invention can be prepared by direct mixing of the catalyst components. This may be done while the components are in contact with the monomer to be polymerized or by mixing in the absence of the monomer. The catalyst components may be mixed in bulk or they may be dissolved in an inert solvent and mixed as solutions. They can also be prepared by continuous catalyst make-up procedures. It is usually preferred that the trialkyl aluminum and the tetrahydrocarbyl titanate or titanium triacetylacetonate are not brought together in the absence of the vanadium trichloride. It is further preferred that the vanadium trichloride is finely divided. The catalysts can be prepared over a wide range of temperatures such as from about 0°C. to about 100°C. and preferably from about 25°C. to about 70°C.

Catalysts prepared in the presence of the monomer and having titanium triacetylacetonate as the titanium component have been found to be typically more active by polymerizing 2-ethyl-1,3-butadiene to the polymers of this invention at a faster rate than the corresponding catalysts having titanium tetraisopropoxide as the titanium component under corresponding polymerization conditions.

Catalysts prepared with the titanium triacetylacetonate component in the absence of the monomer may be stored at −25°C. for at least a few days without appreciable loss of activity. It has been found that such "preformed" catalysts are typically more active than the corresponding catalysts prepared in the presence of the 2-ethyl-1,3-butadiene monomer, although at room temperature the activity of such preformed catalysts slowly decreases.

The mol ratio of the trialkyl aluminum ($AlR_3$) to vanadium trichloride ($VCl_3$) can vary over a wide range such as from about 1:1 to about 200:1. It is preferred that the ratio is from about 5:1 to about 20:1.

The mol ratio of tetrahydrocarbyl titanium, Ti(OR')$_4$, to vanadium trichloride (VCl$_3$) can vary over a wide range such as from about 8:1 to about 1:8. The preferred ratio is from about 2:1 to about 0.5:1.

When titanium triacetylacetonate, Ti(Acac)$_3$, is substituted for the tetrahydrocarbyl titanate the mol ratio of vanadium trichloride to the titanium compound is usually from about 4:1 to about 1:4 and preferably from about 1.5:1 to about 0.5:1.

The catalyst is employed in a catalytic amount to polymerize the 2-ethyl-1,3-butadiene. The amount of catalyst used can vary over a wide range depending somewhat upon a number of factors such as the rate of polymerization desired, temperature employed and other conditions, all of which can be varied considerably. Thus, for example, from about 0.01 to about 5 parts by weight calculated as parts of vanadium trichloride per 100 parts by weight of the monomer to be polymerized can be used to catalyze the polymerization reaction. A more desirable range of from about 0.05 to about 0.5 parts by weight of vanadium trichloride per 100 parts by weight of the monomer to be polymerized is usually employed.

The polymerizations of this invention may be conducted in bulk although they are generally carried out in an inert solvent or diluent which does not adversely affect the polymerization. As is understood by those skilled in the art, it is generally desired to form the catalysts and conduct the polymerizations in the absence of materials which adversely affect the polymerizations, particularly materials which inhibit the activity of the catalyst such as water, oxygen and carbon dioxide. Various solvents and diluents can be used representative of but certainly not limitative of which are liquid aromatic hydrocarbons such as benzene and toluene; hydrogenated aromatic hydrocarbons such as tetralin; liquid aliphatic hydrocarbons such as pentane, heptane, hexane, petroleum ether, decane; and cycloaliphatic hydrocarbons such as cyclohexane, decalin, and cyclooctane. Mixtures of such solvents may be used, if desired.

The polymerization can be conducted over a wide range of temperatures such as, for example, from about 0°C. to about 100°C., but below the boiling point of the mixture of solvent and monomer, and preferably from about 25°C. to about 70°C. The polymerization can be conducted at atmospheric pressure or above or below atmospheric pressure. For convenience, the polymerization can be conducted at an autogeneous pressure.

The following illustrative examples are set forth to further exemplify the objects and advantages of the invention. The parts and percentages are by weight unless otherwise indicated.

EXAMPLE I

A reactor was charged under a nitrogen atmosphere with 43.4 parts of n-pentane as a solvent and 7.75 parts of the monomer 2-ethyl-1,3-butadiene. The n-pentane and monomer had been previously dried by treatment with alumina. The reactor was then sequentially charged under dry nitrogen atmosphere with 0.0157 parts of finely divided particulate vanadium trichloride in 0.25 parts of benzene, 0.0355 parts of titanium tetraisopropoxide in 0.11 parts of benzene and 0.297 parts of triisobutylaluminum in 1.0 parts of benzene. The polymerization reaction was allowed to proceed at approximately 50°C. for 24 hours. To the polymerization mixture was added 8.75 parts of a solution comprising 0.25 parts of methanol, 0.1 parts of ditertiary butyl para-cresol as an oxidant and 8.4 parts of benzene. The methanol solution was allowed to diffuse into the viscous polymer solution to stop the polymerization reaction and to protect the polymer against oxidation. To this mixture was then added 60 parts of methanol to coagulate the polymer. A yield of 7.45 parts of coagulated polymer was obtained when dried to a tough, rubbery noncrystalline material having an ultimate tensile strength of about 1300 pounds per square inch at an elongation of about 700 percent according to conventional rubber testing procedures at about 25°C.

The polymer had an inherent viscosity of about 10 dl/g determined in benzene at 30°C., indicating a high molecular weight. The term "inherent viscosity" as used in this specification is defined as the (log$_e$ Relative Viscosity)/(grams of polymer/100 milliliters of solution). "Relative Viscosity" is the viscosity of the polymer solution at 30°C. divided by the viscosity of the solvent at 30°C. Benzene was used as the solvent.

Infrared and nuclear magnetic resonance analyses of the polymer detected no structures other than trans-1,4 in the polymer. Thus the applicant has provided a polymer of 2-ethyl-1,3-butadiene of a structure that is essentially all trans-1,4. Within reasonable limits of these analyses the applicant has provided a polymer of 2-ethyl-1,3-butadiene having a structure that is at least 90 percent trans-1,4 and more reasonably of at least 99 percent trans-1,4 where the remainder of the structure of the polymer, if any, reasonably comprises 1,2 and/or 3,4 structures and/or a cis 1,4 structure.

The Gehman inflection temperature of the polymer was analyzed to be −66°C. from which the glass transition temperature was estimated to be approximately −80°C. as described by G. S. Trick, J. Appl. Polymer Sci. 3, 253 (1960). The polymer melted at about 20°C. as measured in a dilatometer with mercury as the confining fluid and with a heating rate of 5°C. to 10°C. per day.

A portion of the polymer was cooled to −25°C. for 50 minutes and became very stiff. Upon warming to about 20°C. it softened immediately. Dilatrometric, x-ray diffraction, infrared and differential thermal analyses showed that this phenomenon was the melting of a crystalline material.

EXAMPLE II

A reactor was charged under a nitrogen atmosphere with 57 parts of benzene as a solvent and 0.0157 parts of finely divided vanadium trichloride suspended in 0.25 parts of benzene. The benzene had previously been dried by treatment with silica gel. The reactor was then sequentially charged with 0.024 parts of titanium triacetylacetonate in 0.10 parts benzene; 0.20 parts triisobutyl aluminum in 0.80 parts benzene; and finally with 10.6 parts 2-ethyl-1,3-butadiene. The polymerization reaction was allowed to proceed at approximately 50°C. for 24 hours, after which time the polymerization was stopped and the polymer recovered from solution as in Example I. A yield of 9.12 parts of coagulated rubber was obtained. This polymer had essentially the same rubbery characteristics, inherent viscosity, melting point and infrared spectrum as in Example I.

EXAMPLE III

Using the procedure of Example I, 100 parts of the trans-1,4 rubbery polymer of 2-ethyl-1,3-butadiene was prepared, and premasticated one minute on an open unheated rubber mill in the presence of 9 parts of an extending oil. In a Brabender mixer the following ingredients were mixed with 109 parts of this extended polymer:

| | | |
|---|---|---|
| Extending oil (mixture of aromatic, naphthenic and paraffinic constituents obtained as Shellflex 310 from The Shell Oil Company) | 81 | parts |
| High Structure HAF carbon black | 120 | " |
| Antioxidant (mixture of diaryl phenylenediamines) | 1 | " |
| Stearic acid | 3 | " |
| Zinc oxide | 5 | " |
| Sulfur | 3.1 | " |
| Primary accelerator | 1.5 | " |
| Secondary accelerator | 0.2 | " |
| Antioxidant (polymerized 1,2-dihydro-2,2,4-trimethylquinoline obtained as Flectol H from The Monsanto Company) | 1.0 | " |

Tensile sheets were molded from this compound and cured 10 minutes at 275°F. Instron dumbbell tensile specimens having narrow section with cross-section 1/10 inches by 1/16 inches were die-cut and tested with a separation speed of 5 inches per minute. Such a specimen had an ultimate tensile strength of 2300 pounds per square inch at 600 percent elongation at about 25°C.

While certain representative embodiments and details have been shown for the purpose of illustrating the invention, it will be apparent to those skilled in this art that various changes and modifications may be made therein without departing from the spirit or scope of the invention.

I claim:

1. A rubbery, amorphous polymer of 2-ethyl-1,3-butadiene characterized by having a structure comprising at least about 98 percent of a trans-1,4-addition structure, having a melting point of from about 18°C. to about 25°C. measured by dilatometric analysis with mercury as the containing fluid and a heating rate of 5°C. to 10°C. per day, having an inherent viscosity of from about 6 to about 10 dl/g, and having an ultimate tensile strength of from about 500 to about 2000 pounds per square inch at an elongation of from about 400 to about 800 percent at about 25°C.

* * * * *